UNITED STATES PATENT OFFICE.

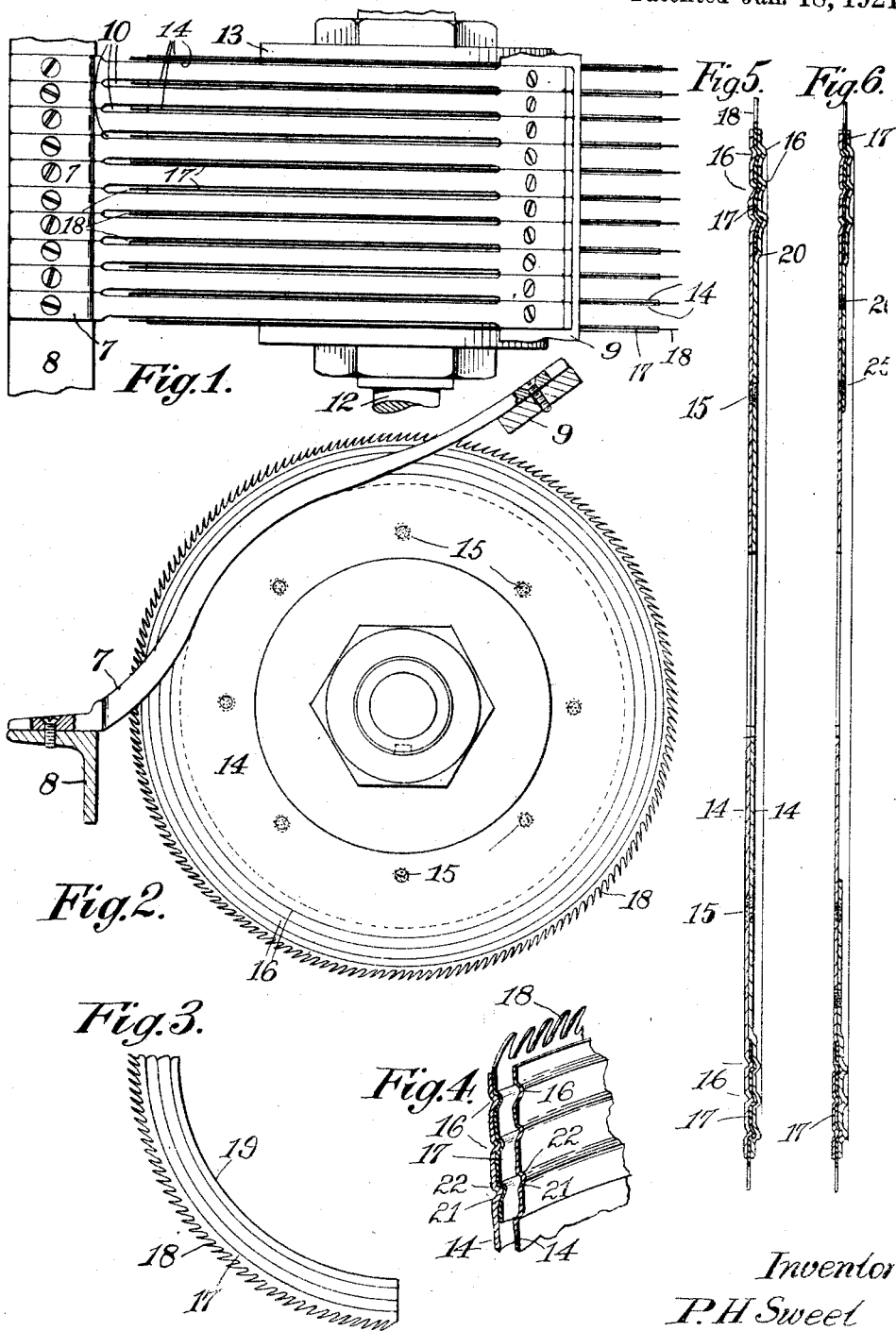

PARKER H. SWEET, OF BOONTON, NEW JERSEY.

GIN OR LINTER SAW.

1,365,866.     Specification of Letters Patent.     Patented Jan. 18, 1921.

Application filed June 23, 1919. Serial No. 305,997.

*To all whom it may concern:*

Be it known that I, PARKER H. SWEET, a citizen of the United States, and a resident of Boonton, in the county of Morris and State of New Jersey, have invented new and useful Improvements in Gin or Linter Saws, of which the following is a specification.

This invention relates to saws for cotton gins or linters comprising disks having dentations or teeth at the periphery mounted in juxtaposed relation upon a shaft to constitute a saw cylinder. To obviate the necessity of removing the disks from the shaft to sharpen the teeth or to substitute a new saw for a saw the teeth of which have been broken or worn the dentated or toothed portion of the saw is made separate from the disk, the latter serving as a carrier for said toothed portion, and said toothed portion and the disk are arranged to releasably secure the two together for which purpose various means have been devised. However, in all such securing means portions protrude or project from the side of the disk forming obstructions. In the use of the saws a portion engages in or extends through spaces in what is known as a "rib breast" of the gin or linter and upon which the cotton to be ginned is supported, the saws operating to pull the fiber or lint from the seeds through such spaces. These spaces are relatively small to prevent the seed from falling therethrough during the ginning operation. The disks or carriers are made of relatively thin and springy sheet material, such as steel, with the result that often they are warped or distorted and in the use of securing means where portions protrude from the side of the disk such protuberances strike the edges of the openings in the rib breast rupturing and breaking off such securing means.

It is the object of the present invention to provide a saw in which the dentated or toothed portion of the saw is releasable from the disk or its carrier; and to provide an improved method of and means for releasably securing the toothed portion to its carrier which is novel and cheap in construction, and which securing means forms no obstruction protruding from the side of the disk but presents a smooth and unbroken surface.

In the drawing accompanying and forming a part of this specification, Figure 1 is a plan view of a portion of a saw cylinder with an embodiment of my improved saw applied thereto and showing the relation of the saw to the rib breast of a gin or linter.

Fig. 2 is a sectional end elevation of the saw cylinder shown in Fig. 1.

Fig. 3 is a side elevation of a section of the toothed portion of the saw.

Fig. 4 is a sectional perspective view of a portion of the saw to show the manner of releasably securing the toothed portion to its carrier.

Fig. 5 is a cross sectional view of a gin or linter saw showing an embodiment of my invention; and Fig. 6 is a view similar to Fig. 5 showing a modified construction of saw.

Similar characters of reference designate like parts throughout the different views of the drawing.

In Figs. 1 and 2 of the drawing I have shown an embodiment of my invention in connection with a portion of the rib breast of a cotton gin or linter, comprising a series of ribs 7 mounted in juxtaposed relation at opposite ends upon supports 8, 9, as by screws passing through openings in the ribs and threaded into the supports, and the ribs are arranged to provide relatively narrow spaces 10 between the ribs through which a portion of the peripheral and toothed portion of the saws are adapted to extend to engage the material supported upon the rib breast to be ginned or cotton seed to be linted, the spaces 10 being of such width as to prevent the seed from falling therethrough. The saws are mounted upon a shaft 12 to rotate therewith in juxtaposed relation and spaced apart by spacing blocks or collars 13 interposed between the saws.

My improved saw comprises a circular carrier and an annulus of less width than from the axis to the circumference of the saw, preferably consisting of segmental sections formed with dentations or teeth at the external edge, and either one of which is arranged with a furcated portion for the engagement of the other, and the legs of the furcated portion being yieldable and by their inherent tension to lie contiguous to each other, although adapted to be sprung laterally.

The construction of saw shown in Fig. 5, and which may be the preferred form, comprises a pair of circular members or disks 14, 14 of springy material fixed together at a point within the periphery, as by spot welding indicated in a general way at 15. By so connecting the disks an integral disk member is provided the peripheral portions of which are free and forming a bifurcated peripheral portion. The free or bifurcated portion of the disks is arranged with concentric corrugations or beads 16 with the corrugations of one leg of the bifurcation complemental to and in the same plane as the other as clearly shown in Figs. 4 and 5.

An annular blade or annulus 17 having dentations or teeth 18 at the external edge and comprising a series of segmental sections (Figs. 2 and 3) and having concentric corrugations or beads 19, which are preferably concentric with the axis of the saw, within the toothed edge to extend to the edge opposite to the teeth. The sections of this annulus are adapted to engage between the legs of the bifurcation at the periphery of the disks or carrier, and the corrugations of the sections are complementary to the corrugations in said bifurcated portion. To limit the movement of the sections of the annulus into the bifurcation one of the disks has an annular recess within the corrugated portion as shown at 20 to form a seat for the engagement of the internal edge of the annulus sections, this recess being located so that only the toothed zone of the blade or annulus will project beyond the periphery of the disks 14. The cross sectional shape or form of the corrugations of the disks and blade is such that the inclination of one portion of the corrugations will extend at an acute angle to the sides of the disks and blade, as shown at 21, and the opposite portion extends at an obtuse angle to the sides of the disks and blade, as shown at 22, with the juncture portion rounded. By this arrangement the blades may be readily forced into the bifurcation, the uncorrugated portions of the the bifurcation readily riding over the inclined portions 21 of the corrugations of the blade sections, and when the corrugations of the blade sections engage in the corrugations of the bifurcation the inclined portions 22 of the corrugations serving to lock the blade sections in position, although they may be readily released by a radial pull on the blade sections. By this arrangement of securing the blade sections to the carrier although the corrugations project laterally from the carrier, such projections present a continuous and unbroken surface without forming any obstructions to strike against the ribs of the rib breast of the cotton gin or linter should the carrier be warped or distorted with the consequent rupturing or breaking of the securing means and thereby the releasing of the blade sections from the carrier.

In the modification shown in Fig. 6 the construction is substantially the same as described with the exception that instead of utilizing a pair of disks and securing them together in such a manner as to provide a bifurcated portion at the periphery only one disk is utilized arranged with the annular corrugations 16. An annular member 25 is fastened to the disk adjacent its inner edge, preferably by spot welding as shown at 26, with the external edge concentric with the periphery of the disk and the inherent tension of the material of said member being such that it will normally lie contiguous to the disk. The annular member 25 is arranged with corrugations complemental to the corrugations 16 of the disk and the annular recessed portion 20 to form a seat for the internal edge of the saw blade sections 19.

Variations may be resorted to within the scope of the invention

Having thus described my invention, I claim:

1. In gin or linter saws, an annular section of less width than from the axis to the circumference of the saw arranged with teeth along the outer edge and longitudinal corrugations stamped within the toothed zone for the purpose specified.

2. In gin or linter saws, a curved band of less width than from the axis to the circumference of the saw, said band having teeth formed on the outer edge and longitudinal corrugations stamped within the toothed zone and to the inner edge of the band opposite the teeth for the purpose specified.

3. In gin or linter saws, the combination with a circular carrier having an annular bifurcated portion arranged with corrugations, and a toothed blade to engage in the bifurcation of the carrier and corrugated complementary to the corrugations of the carrier for the purpose specified.

4. In gin or linter saws, the combination of a circular carrier having an annular bifurcated peripheral portion with each leg of the bifurcation corrugated concentric with the axis of the carrier and complemental to each other, and an annular strip dentated externally to engage in the bifurcation of the carrier and corrugated complementary to the corrugation of the bifurcation of the carrier for the purpose specified.

5. In gin or linter saws, the combination of a toothed annulus and a disk to carry the same, both of which are arranged with annular corrugations, and one of which is bifurcated for the engagement of the other to releasably connect the toothed annulus to the disk.

6. In gin or linter saws, the combination of a disk member and an annular member having external dentations and consisting of a plurality of segmental sections, and each section arranged with longitudinal corrugations, and the disk member having an annular bifurcation at the periphery for the engagement of the annular member and the legs of the bifurcation having corrugations complemental to the corrugations of the annular member for the purpose specified.

7. In gin or linter saws, the combination of an annulus comprising segmental sections arranged with external dentations and longitudinally corrugated within said dentations and extending to the internal edge, and a circular carrier for said annulus having an annular bifurcation at the periphery for the engagement of the annulus and the bifurcation arranged with corrugations complemental to and adapted to engage the corrugations of the annulus to releasably secure the latter within the bifurcation.

8. In gin or linter saws, the combination of a toothed annulus consisting of segmental sections and arranged with corrugations to extend longitudinally thereof, and a carrier for said annulus comprising a plurality of disks of yielding material secured together with the peripheral portions free and between which free portions the annulus is adapted to engage, and said free portions of the disk being corrugated complemental to each other and the corrugations of the annulus for the purpose specified.

9. In gin or linter saws, a plurality of circular members arranged to be mounted on a shaft in juxtaposed relation and to rotate with the shaft, and each member having a resilient furcated corrugated portion at the periphery for the purpose specified.

10. In gin or linter saws, a plurality of circular members arranged to be mounted on a shaft in juxtaposed relation and to rotate therewith, and each member having a resilient furcated corrugated portion at the periphery, and a toothed blade to engage in the furcated portion of each circular member and corrugated complementary to the corrugation of the furcated portion of the circular members.

11. In gin or linter saws, a circular member having a furcated peripheral portion and concentrically corrugated, and a curved blade having dentations on the outer edge to engage in the furcated portion of the circular member and corrugated complementary to the corrugation of the furcated portion of said circular member for the purpose specified.

12. In gin or linter saws, a pair of disks of resilient material secured together with the peripheral portions free to provide a bifurcated portion at the periphery arranged to normally lie contiguous to each other and adapted to be sprung laterally, and segmental toothed blades to engage between the bifurcated portions of the disks and releasably secured therein for the purpose specified.

13. In gin or linter saws, a pair of disks of resilient material secured together with the peripheral portions free to provide a bifurcated portion at the periphery arranged to normally lie contiguous to each other and adapted to be sprung laterally, and said bifurcated portions being concentrically corrugated and complementary to each other, and segmental blades having teeth on the outer edge to engage between the bifurcated portion of the disks and arranged with corrugations complementary to the corrugations of the disks for the purpose specified.

PARKER H. SWEET.